Oct. 26, 1937.   T. KOLAROVIC   2,096,854
BRAKE OPERATING MEANS
Filed Oct. 7, 1936   3 Sheets-Sheet 2
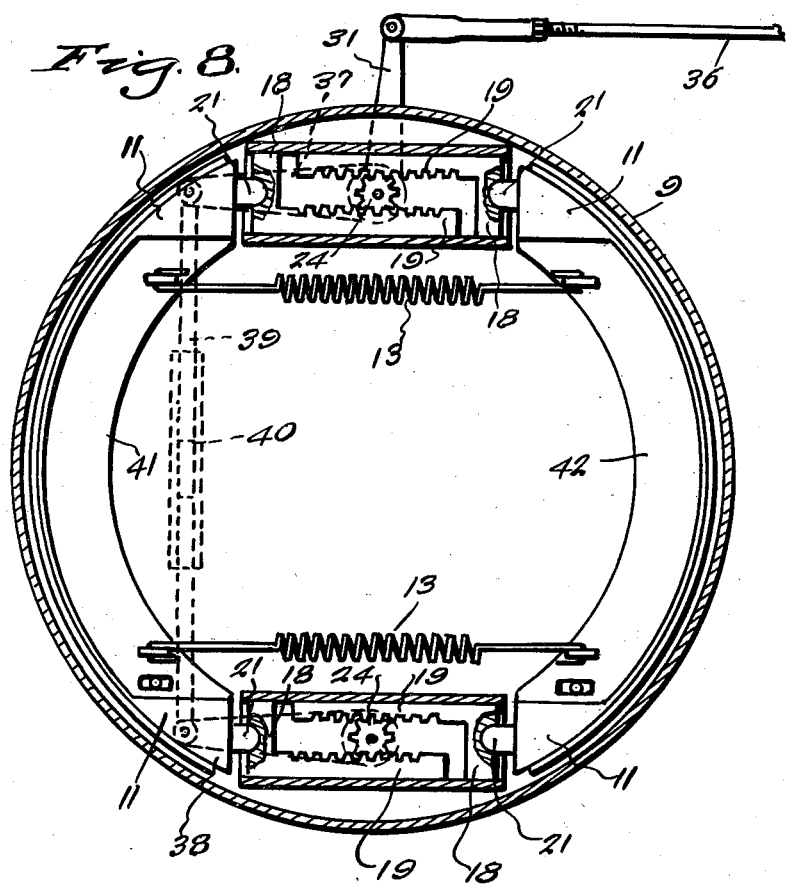
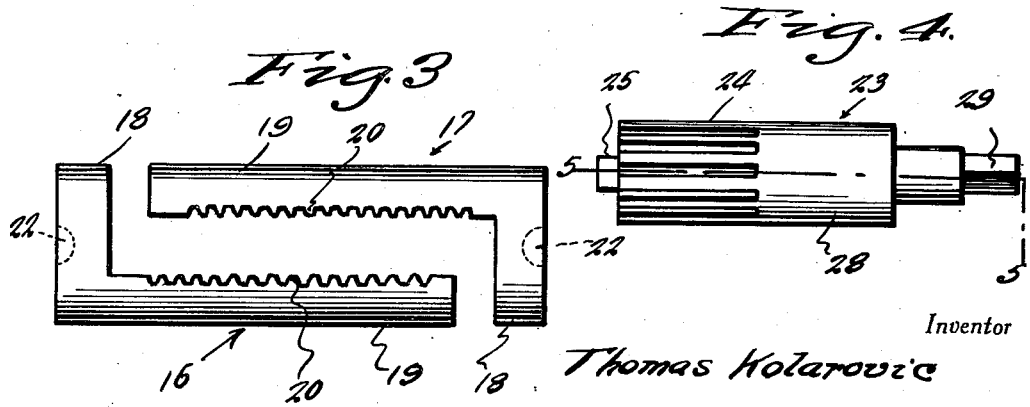
Inventor
Thomas Kolarovic
By Clarence A. O'Brien
Hyman Berman
Attorneys Patented Oct. 26, 1937

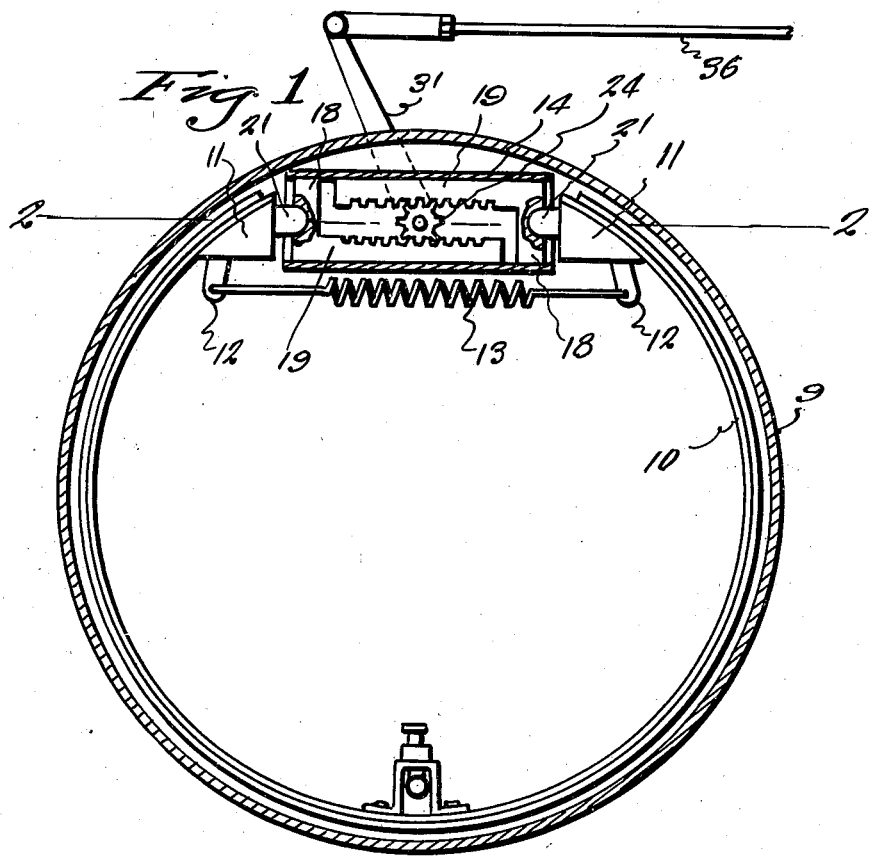
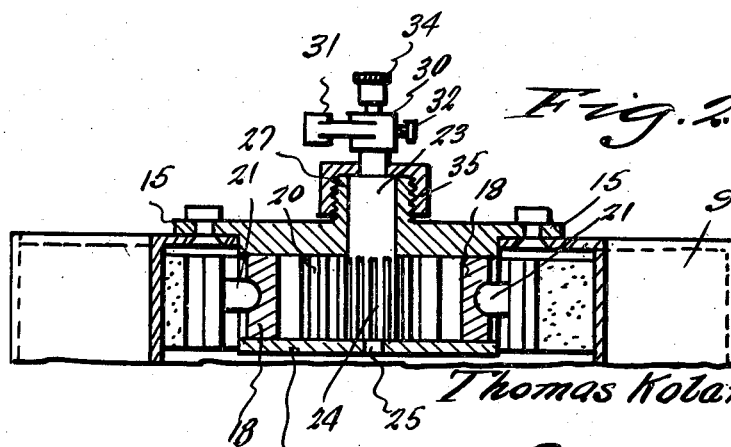

2,096,854

UNITED STATES PATENT OFFICE 2,096,854

BRAKE OPERATING MEANS

Thomas Kolarovic, Willoughby, Ohio

Application October 7, 1936, Serial No. 104,521

1 Claim. (Cl. 188—78)

The present invention relates to what is believed to be a novel and improved mechanical brake construction, wherein the novelty resides in the specific means adapted to control the action of the encased brake shoes.

In reducing the principles of the invention to practice, I have adopted a simple and efficient multiple rack and pinion assemblage interposed between the adjacent ends of the brake shoe and actuated through the instrumentality of an oscillatory rocker or crank arm in a manner to effectively and progressively force the brake shoes into frictional braking contact with the complemental brake drum. Recited with greater particularity, the essential improvements reside in the construction and provision of a cylinder interposed between the adjacent ends of the brake shoes wherein said cylinder is provided with reciprocatory oppositely projectible and retractible thrust members having rack and pinion means for accomplishing the desired results in a safe, reliable and practical manner.

Other features and advantages will become more readily apparent from the following description and drawings.

In the drawings, wherein like numerals designate like parts throughout the views:

Figure 1 is a view partly in section and partly in elevation showing the brake drum with internal single-type brake shoe, and the improved brake shoe controlling or operating means directly associated with the adjacent relatively movable ends of said brake shoe.

Figure 2 is a horizontal sectional view on the plane of the line 2—2 of Figure 1.

Figure 3 is an assembly elevational view of the companion or complemental reciprocatory plunger provided with requisite rack teeth.

Figure 4 is a detail elevational view of the oscillatory pinion actuator for the rack bars.

Figure 8 is a view similar to Figure 1 showing a dual or duplex brake shoe arrangement, the principle of the invention being the same as represented in Figure 1.

Figure 6:
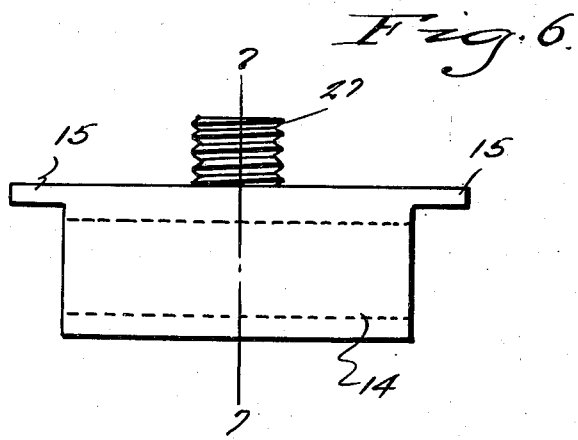
Figure 6 is an elevational view of the plunger accommodating cylinder.

Attention is first invited to Figures 1 to 7 inclusive, wherein the invention is illustrated with sufficient completeness to permit a clear understanding of the invention to be obtained. It might be stated here, however, that the invention is applicable to the single-type brake shoe assembly shown in Figure 1, or the duplex style shown in Figure 8. So far as the invention itself is concerned, however, the construction is generically the same.

Proceeding with this thought in mind, it will be observed that the brake drum, which is substantially conventional, is denoted by the numeral 9. The brake shoe of the single type shown in Figure 1, is denoted by the numeral 10 and is also conventional. In accordance with the present invention, however, I provide segmental adapter blocks 11, these being attached to the ends, that is the separated ends, of the brake bands. These blocks are provided with ears 12 with which the ends of the return spring 13 connect. The spring 13 is of the customary contraction coiled type. Therefore, the tendency of the spring is to release the brake band or shoe. The improved plunger-type operating means is interposed between the blocks 11. The means comprises as a major part, a cylinder 14 having attaching elements 15 of a suitable type. The cylinder is open at its opposite ends to accommodate reciprocatory inner and outer oppositely sliding plungers 16 and 17. These are of duplicate construction and each includes a disc-like head 18 having an eccentrically disposed shank 19 formed integral therewith and extending at right angles therefrom in the manner shown. The so-called shank 19 is substantially semi-circular in cross-sectional form to properly slide in the cylinder. The opposed faces thereof are provided with rack teeth 20 and therefore, the features 19 and 20 constitute reciprocatory rack bars. It will be observed that the special adapter blocks 11 are provided with alined lugs 21 whose inner ends are rounded to project into semispherical sockets 22 in the plunger heads 18. This provides the desired self-adapting ball and socket type joint and connection between the plungers and the free movable ends of the brake bands or shoes.

I next call attention to the part 23 in Figure 4. This is primarily an oscillatory pinion member. The cylindrical body portion thereof is fluted at one end as indicated at 24 to form the pinion teeth and these engage the rack teeth 20. Beyond the pinion is a reduced pintle or journal 25 which is mounted for rotation in a bearing 26 in the cylinder. Opposite to the bearing 26 is an enlarged bearing including a screw-threaded projecting portion 27. This serves to accommodate the spindle portion 28 of the pinion member 23.

Figure 5:
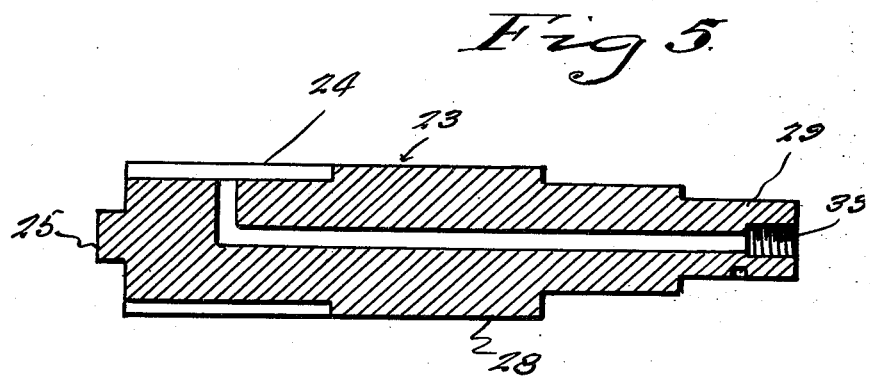
Figure 5 is an enlarged longitudinal sectional view taken on the plane of the line 5—5 of Figure 4.
Figure 7:
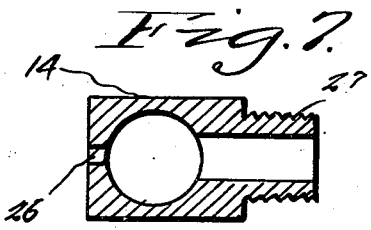
Figure 7 is a cross section on the plane of the line 7—7 of Figure 6.

Beyond the spindle 28, the member 23 is reduced and provided with a polygonal extension 29. This constitutes a key to accommodate a collar 30 on the rocker arm 31 as shown to advantage in Figure 2. The collar is held in place by a set screw 23. Then as shown in Figure 5, there is a screw-threaded socket as at 33 which serves to accomodate a lubricant cup 34. The numeral 35 in Figure 2 designates an assembling cap nut which is connected with a screw-threaded nipple or bearing extension 27. Referring now to Figure 1, it will be observed that the push-pull rod 36 which is connected with the foot pedal in the car (not shown) is in turn pivotally connected with the rocker arm 31 so that it may be worked back and forth in an obvious purposeful manner.

Assuming then that the parts are assembled as shown in Figures 1 and 2, it is evident that when the foot pedal is depressed, the rod 36 is moved in a direction to rock the arm 31 and this in turn oscillates the pinion 24. The pinion being in operating connection with the rack bars 20 serve to project these in opposite directions through the opposite open ends of the cylinder, forcing the brake band into frictional engagement with the brake drum 9. When the pedal is released, the return spring 13 comes into play to return the parts to their normal released positions.

So far as the mechanism in the double arrangement in Figure 8 is shown, it is the same as that already described and therefore the same reference characters are used for the identical parts. The only difference in this arrangement is to provide the necessary motion transmitting means between the upper brake shoe operating means and the lower means. This is accomplished by providing an additional rocker arm, that is, an auxiliary arm 37 which is connected with the complemental rocker arm 38 by linkage, or a connecting rod 39 as shown in dotted lines. The numeral 40 designates an adjusting coupling permitting the parts to be properly regulated to provide for operation of the brake shoes 41 and 42 in unison.

As before indicated, the essential novelty is the provision of the means interposed between the ends of the brake shoes or bands in either the single or double acting arrangements shown in the drawings. That is to say, the gist of the invention resides in the provision of the special cylinder 14, the plungers 16 and 17 mounted for reciprocation therein and the rocker arm controlled rack and pinion means. Specifically, the plungers 16 and 17 might be described as of general L-shaped form with the rack bar portion thereof in spaced parallelism and with the heads thereof slidably mounted in the open-ended cylinder. The part 23 may be satisfactorily called a rocker unit or rocker arm controlled pinion extending for rotation into the cylinder intermediate the ends thereof at right angles to the longitudinal dimension of the cylinder whereby to get the desired range of action and adjustment. Incidental novelty resides, of course, in the substantially free-acting ball and joint connections 21 and 22 between the brake shoes and projectible and retractible plunger members.

It is thought that persons skilled in the art to which the invention relates will be able to obtain a clear understanding of the invention after considering the description in connection with the drawings. Therefore, a more lengthy description is regarded as unnecessary.

Minor changes in shape, size, and arrangement of details coming within the field of invention claimed may be resorted to in actual practice, if desired.

I claim:

In a brake of the class described, a brake drum, a pair of brake shoes mounted for operation therein having the free ends thereof in spaced relationship, spring return means connected with the adjacent separable ends of the brake shoes, a pair of open ended cylinders mounted between the separable ends of the brake shoes, a pair of duplicate companion plungers mounted for reciprocation in each cylinder, said plungers being provided with rack teeth, means for operatively connecting the plungers with the free end of the brake shoes, a pinion mounted in each cylinder in the central portion thereof and cooperating with the rack teeth therein, said pinion projecting outwardly beyond the cylinder, and being provided with a rocker arm, a link connecting the rocker arms of each cylinder, and means for actuating one of the rocker arms to effect simultaneous operation of said other rocker arm.

THOMAS KOLAROVIC.